(12) United States Patent
Yamada et al.

(10) Patent No.: US 6,818,600 B2
(45) Date of Patent: Nov. 16, 2004

(54) HEAT-DISSIPATING SILICONE GREASE COMPOSITION

(75) Inventors: Kunihiro Yamada, Gunma (JP); Osamu Uchida, Usui-gun Gunma (JP)

(73) Assignees: Shin-Etsu Chemical Co. Ltd., Tokyo (JP); Denso Corporation, Tokyo (JP)

( * ) Notice: Subject to any disclaimer, the term of this patent is extended or adjusted under 35 U.S.C. 154(b) by 0 days.

(21) Appl. No.: 10/409,133

(22) Filed: Apr. 9, 2003

(65) Prior Publication Data

US 2003/0195124 A1 Oct. 16, 2003

(30) Foreign Application Priority Data

Apr. 10, 2002 (JP) .......................................... 2002-107423

(51) Int. Cl.[7] .................. C01M 107/50; C01M 125/00
(52) U.S. Cl. .................. 508/126; 508/150; 508/155; 508/161; 508/172; 508/173; 508/208
(58) Field of Search .................. 508/126, 208

(56) References Cited

U.S. PATENT DOCUMENTS

| | | | |
|---|---|---|---|
| 4,444,944 A | 4/1984 | Matsushita | |
| 5,021,494 A | 6/1991 | Toya | |
| 5,100,568 A | 3/1992 | Takahashi et al. | |
| 5,981,641 A | * 11/1999 | Takahashi et al. | ............ 524/428 |
| 6,015,777 A | * 1/2000 | Lostritto et al. | ............ 508/208 |
| 6,174,841 B1 | * 1/2000 | Yamada et al. | ............ 508/172 |
| 6,031,025 A | 2/2000 | Mercer et al. | |
| 6,114,429 A | * 9/2000 | Yamada et al. | ............ 524/432 |
| 6,136,758 A | * 10/2000 | Yamada et al. | ............ 508/172 |
| 6,255,257 B1 | * 7/2001 | Yamada et al. | ............ 508/172 |
| 6,372,337 B2 | * 4/2002 | Takahashi et al. | ............ 428/328 |
| 6,635,605 B1 | * 10/2003 | Como et al. | ............ 508/183 |

FOREIGN PATENT DOCUMENTS

| | | |
|---|---|---|
| EP | 0 896 031 A3 | 2/1999 |
| EP | 0 896 031 A2 | 2/1999 |
| EP | 1 167 457 A3 | 1/2002 |
| EP | 1 167 457 A2 | 1/2002 |

OTHER PUBLICATIONS

Japanese Patent Abstract No. JP 02 097560, dated Apr. 10, 1990.

* cited by examiner

*Primary Examiner*—Ellen M. McAvoy
(74) *Attorney, Agent, or Firm*—Millen, White, Zelano, Branigan, P.C.

(57) ABSTRACT

To provide a highly reliable heat-dissipating silicone grease composition having stable thermoconductive properties over a long period of time, which does not exude oil, and which does not lead to contact defects.

The heat-dissipating silicone grease composition, comprising:

(A) 100 weight parts of an organopolysiloxane having a thixotropicity degree α of 1.03–1.50 and a viscosity at 25° C. of 100–1,000,000 mm$^2$/s, and
(B) 100–2,000 weight parts of a thermoconductive inorganic filler having an) average particle diameter of 0.1–100 micrometers.

25 Claims, 1 Drawing Sheet

Heat-dissipating silicone grease composition

Blasted glass

Oil bleed width

[Fig. 1]
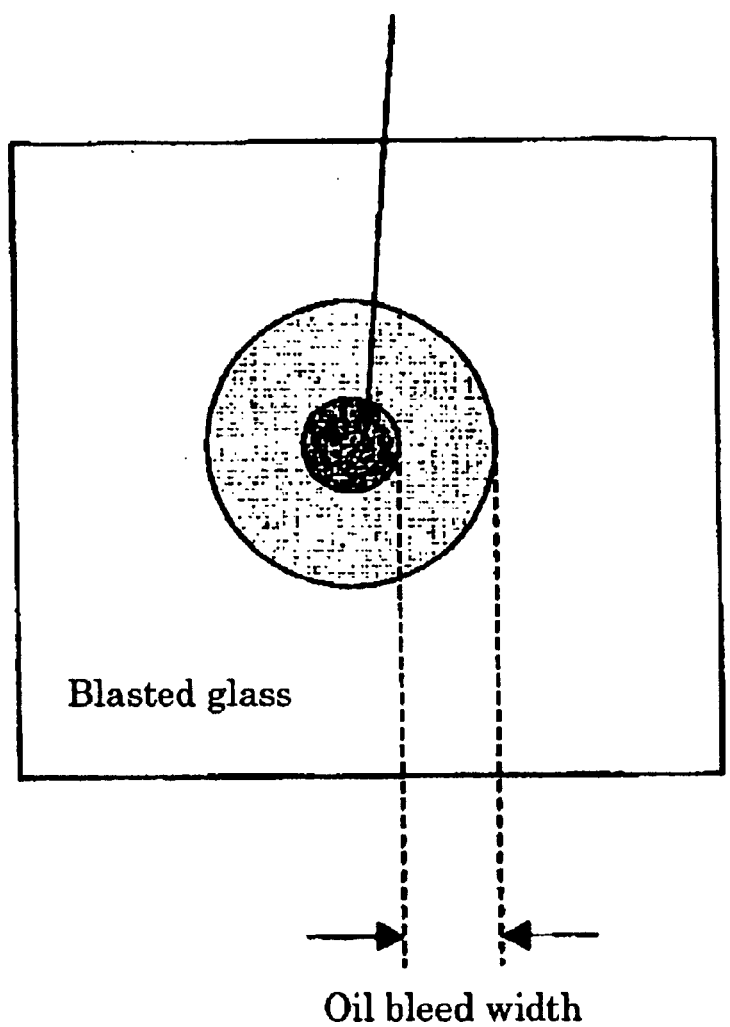

HEAT-DISSIPATING SILICONE GREASE COMPOSITION

FIELD OF THE INVENTION

This invention relates to a heat-dissipating grease composition, and more specifically, to a heat-dissipating silicone grease composition suitable for use over a long period of time.

BACKGROUND OF THE INVENTION

Heat-dissipating silicone greases based on silicone grease and containing various kinds of powders as fillers, are known in the prior art (Tokko Sho 52-33272, Tokko Sho 59-52195, Tokkai Sho 52-125506, Tokkai Sho 57-36302, Tokkai Sho 62-43492, Tokkai Hei 2-212556 and Tokkai Hei 3-162493 (Koho)).

However, when used over a long period of time, the base oils in these silicone greases sometimes bled so that their heat-dissipating properties declined, or led to poor connections in electrical contacts.

As a result of intensive studies aimed at solving the above problem, the inventors found that the exudation of base oil could be suppressed by using a specific organopolysiloxane as the base oil, and thereby arrived at this invention.

It is therefore an object of this invention to provide a highly reliable silicone grease composition for heat dissipation having stable thermoconductive properties over a long period of time, which does not exude oil, and which does not lead to contact defects.

SUMMARY OF THE INVENTION

The above object is attained by a heat-dissipating silicone grease composition comprising:

(A) 100 weight parts of an organopolysiloxane having a thixotropicity degree α of 1.03–1.50 and a viscosity at 25° C. of 100–1,000,000mm²/s, and
(B) 100–2,000 weight parts of a thermally conductive inorganic filler having an average particle diameter of 0.1–100 micrometers.

BRIEF DESCRIPTION OF DRAWING

FIG. 1 is a conceptual view of an exudation evaluation test.

DETAILED DESCRIPTION OF THE INVENTION

The organopolysiloxane which is component (A) of the heat-dissipating silicone grease composition of this invention has thixotropicity properties. The thixotropicity properties of oil are expressed by the thixotropicity degree α, the viscosity of the oil being larger, the larger α is. In this invention, the thixotropicity degree of the oil must lie within the range 1.03–1.50, but preferably 1.05–1.40. If the thixotropicity degree α is less than 1.03, as the viscosity of the oil is low, the affinity of this organopolysiloxane to the thermoconducting filler is weak, and oil easily exudes from the silicone grease composition. On the other hand, if the thixotropicity degree is larger than 1.50, it is difficult to mix component (A) and component (B).

The thixotropicity degree α can be calculated from the relation $\alpha=\eta_1/\eta_2$. Herein, $\eta_1$, $\eta_2$ are viscosities measured by a B type rotational viscometer at 25° C. $\eta_1$ is the value measured when the rotation speed of the rotor is β rpm, and $\eta_2$ is the value measured at the rotation speed of 2×β rpm. The viscosity of this organopolysiloxane at 25° C. measured by a B type rotational viscometer must lie within the range of 100–1,000,000 mm²/s, but preferably within the range of 1.000–100,000 mm²/s. If it is less than 100 mm²/s, the stability of the silicone grease composition obtained is poor, and if it is larger than 1,000,000mm²/s, mixture with component (B) is difficult.

The organopolysiloxane of component (A) can be easily obtained for example by an addition reaction between an organopolysiloxane having two or more alkenyl groups in the molecule, and a hydrogen organopolysiloxane having two or more SiH groups, in the presence of a platinum catalyst, e.g., platinum, chloroplatinic acid, a platinum-olefin complex or platinum-alcohol complex. Provided that the organopolysiloxane has two or more alkenyl groups directly bonded to silicon atoms in the molecule, it may be straight chain or branched. It may also be a mixture of two or more types having different viscosities.

The alkenyl group may be vinyl, allyl, 1-butenyl or 1-hexenyl, etc., but it is preferably vinyl from the viewpoints of ease of synthesis and cost.

Other organic groups which may be combined with silicon atoms are alkyl groups such as methyl, ethyl, propyl, butyl, hexyl and dodecyl, aryl groups such as phenyl, aralkyl groups such as 2-phenyl ethyl and 2-phenyl propyl, and substituted hydrocarbon groups such as chloromethyl or 3,3,3-trifluropropyl. Of these, it is preferred that 90% or more of the organic groups is methyl from the viewpoints of ease of synthesis and cost. The alkenyl groups combined with silicon atoms may occur at the end of or in the middle of the organopolysiloxane chain, but they are preferably present only at both ends from the viewpoint of flexibility.

The above-mentioned hydrogen organopolysiloxane which has at least two Si—H groups may be represented by the following general formula (1).

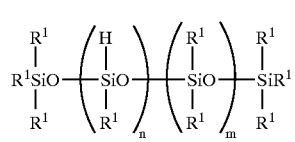

(1)

In the above formula, $R^1$ is at least one selected from a hydrogen atom, saturated or unsaturated monovalent hydrocarbon groups having 1–20 carbon atoms. Examples are alkyl groups such as methyl, ethyl, propyl, hexyl, octyl, decyl, dodecyl, tetradecyl, hexadecyl and octadecyl; cyclohexyl groups such as cyclo pentyl and cyclohexyl; aryl groups such as phenyl and tolyl; alkenyl groups such as vinyl and allyl; aralkyl groups such as 2-phenylethyl and 2-methyl-2-phenylethyl; and halogenated hydrocarbon groups such as 3,3,3-trifluoropropyl, 2-(perfluorobutyl) ethyl, 2-(perfluoro octyl)ethyl and p-chlorophenyl. It is preferred that 90% or more of R1 are methyl groups from the viewpoint of ease of synthesis and cost. n and m respectively lie within the ranges $1 \leq n \leq 1,000$ and $0 \leq m \leq 1,000$.

To obtain the organopolysiloxane which is component (A) by the above addition reaction, two or more kinds of organopolysiloxane having an alkenyl group and organopolysiloxane having a Si—H group, may be used respectively. Also, a dimethylpolysiloxane without a reactive group may be mixed with the other components.

As another method, it may also be obtained by introducing a [$R^2SiO_{3/2}$] unit or [$SiO_{4/2}$] unit in addition to the

[R²₃SiO_{1/2}] unit and [R²₂SiO] unit which are structural units of common linear organopolysiloxanes. Herein, R² is identical to R¹ in the aforesaid general formula (1).

There is no particular limitation on the method of manufacturing these organopolysiloxanes.

For example, (1) $(CH_3)_3SiCl$, $(CH_3)_2SiCl_2$, $(CH_3)SiCl_3$ can be hydrolyzed and condensed.
(2) This condensate can be reacted with a cyclic low polymer siloxane at room temperature or with heating in the presence of a catalyst selected from a hydroxide, such as an alkali metal hydroxide, alkali metal silanolate, tetra-alkylphosphonium hydroxide and tetraalkylammonium hydroxide, or a strong acid such as sulfuric acid or organic sulfonic acid.
(3) Alternatively, an organopolysiloxane having a hydroxyl group, a $(CH_3)_3SiO_{1/2}$ unit and $SiO_2$ unit, is reacted with a polydiorganosiloxane having a silanol group at room temperature or with heating in the presence of a condensation catalyst, such as an amine catalyst or tin catalyst.

The thermoconductive inorganic filler which is component (B), is for imparting thermal conductivity to the silicone grease composition of this invention. The average particle diameter of this thermoconductive filler must lie within the range of 0.1–100 micrometers, but it is preferably within the range of 1–20 micrometers. If it is less than 0.1 micrometers, the viscosity of the composition obtained is too high and it has poor extensibility, whereas if it is larger than 100 micrometers, the composition is uneven. The blending amount lies in the range of 100–2,000 weight parts, but it preferably lies within the range of 200–1,500 weight parts. If the blending amount is less than 100 weight parts, the thermal conductivity of the composition obtained is poor and storage stability is poor, whereas if it exceeds 2,000 weight parts, it has poor extensibility.

The filler is suitably chosen from inorganic substances having good thermal conductivity known in the art, preferred examples being aluminum powder, zinc oxide powder, alumina powder, boron nitride powder, aluminium nitride powder, silicon nitride powder, copper powder, silver powder, diamond powder, nickel powder, zinc powder, stainless steel powder and carbon powder. These may have a spherical or irregular shape, and two or more kinds thereof may be used.

In order to manufacture the grease of this invention, component (A) and component (B) are mixed by a mixer such as a Trimix, Twinmix, Planetary Mixer (registered trademarks of Inoue Seisakusyo K. K.), an Ultramixer (registered trademark of Mizuho Kogyo K. K.), and a Hivis Supermix (registered trademark of Tokushukika Kogyo K. K.). The mixture may be heated to 50–150° C. if required. Further, as mentioned above, when performing the addition reaction between an organopolysiloxane having two or more alkenyl groups in the molecule and a hydrogen organopolysiloxane having two or more Si—H groups, which is component (A), the manufacturing process can be simplified by first stirring the organopolysiloxane having the alkenyl group and hydrogen organopolysiloxane beforehand with component (B), and adding a catalyst such as a platinum compound, etc.

After mixing, it is preferred to perform a kneading operation under a high shearing force to give a uniform finish. The kneading apparatus may be a three roller type, colloid mill, sand grinder, etc., but the three roller type is preferred.

As the silicone grease composition of this invention obtained as described above has stable thermoconduction properties over long periods of time without exudation of the base oil, it is suitable as a heat-dissipating grease.

EXAMPLES

Hereafter, this invention will be further described referring to the embodiments, but it is not limited thereto.

For the bleed-out suppression test, a blasted glass plate of 10 cm side length was arranged horizontally, and grease circles of diameter 1 cm were applied 0.25 g at a time as shown in FIG. 1. The plate was left at room temperature, and the width which became translucent due to oil bleeding was measured in mm units at one day, seven days and one month. The thermal conductivity was measured at 25° C. using a QTM-500 thermoconductivity meter (Kyoto Electronics Industries, Ltd.). The value of the viscosity at 25° C. is also shown, and a TOKIMEC DVM-II viscosity meter was used for the measurement. The thixotropicity degree α was computed from the equation:

$$\alpha = \eta_1/\eta_2.$$

Herein, $\eta_2$ is the viscosity measured at twice the rotation speed of the rotor when measuring $\eta_1$.

Synthesis Example 1

Synthesis of Organopolysiloxane A-1 of Component (A)

500 g of a polysiloxane capped at both ends by a dimethylvinylsilyl group, wherein 5 mol % of the main chain comprised phenyl groups and the remaining 95 mol % comprised methyl groups, and having a viscosity at 25° C. of 700 mm²/s, 3.0 g of the hydrogen organopolysiloxane represented by the following formula (2) and 5.0 g of the hydrogen organopolysiloxane represented by the following (3), were introduced into a flask having an internal volume of 1,000 ml fitted with a stirrer, thermometer, condenser tube and nitrogen gas inlet pipe.

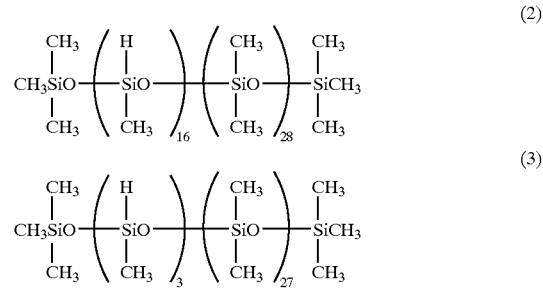

Next, 0.25 g of a dimethylvinylsilyl end-capped dimethylpolysiloxane solution of a platinum-divinyl tetramethyldisiloxane complex containing 1 weight % platinum, was introduced, and mixed with stirring at 120° C. for 1 hour to obtain an organopolysiloxane A-1. When the viscosity of this organopolysiloxane was measured, the following viscosities were obtained.

Viscosimetry results:

26,000 mm²/s (rotor No.4/6 rpm).
22,500 mm²/s (rotor No.4/12 rpm)
The thixotropicity degree α obtained from $\alpha = \eta_1/\eta_2$ was 1.16.

<Synthesis of Base Oil X>

Into 3,000 g of water in a flask having an internal volume of 5 liters fitted with a stirrer, thermometer, condenser and dropping apparatus, and a mixture of 490 g trimethylchlorosilane, 560 g dimethyldichlorosilane and 650 g methyltrichlorosilane, were dripped over 3 hours while cooling the flask so that the temperature of the reaction liquid was 50° C. or less. After stirring at 30° C. for a further 2 hours, the aqueous layer (hydrochloric acid and water) was separated, 1,700 g of a 3 weight % aqueous sodium carbonate solution was added to the organic layer, and the mixture stirred at room temperature for 2 hours.

The aqueous layer was separated and removed, 70 g of anhydrous sodium sulfate was added to the remaining organic layer, and after stirring at room temperature for 3 hours, this was filtered to obtain a transparent, colorless oil X having a viscosity of 14 mm²/s.

Synthesis Example 2

Synthesis of Organopolysiloxane A-2 of Component (A)

10 g of the obtained base oil X, 22 g of trimethylsilyl end-capped polydimethylsiloxane having a viscosity of 10 mm²/s and 300 g of octamethyl cyclotetrasiloxane were introduced into a flask having an internal volume of 500 ml fitted with a stirrer, thermometer, condenser and nitrogen gas inlet tube, and the mixture was heated to 120° C. while passing nitrogen gas. Next, 0.3 g of potassium hydroxide was added, the temperature was raised to 150° C., and after stirring for 4 hours, the solution was cooled to 100° C. 2 g of ethylene chlorohydrin was added, unreacted low polymer siloxane was removed, and an organopolysiloxane A-2 was thus obtained.

The viscosity was as follows.
Viscosimetry results:
36,000 mm²/s (rotor No.4/6 rpm)
27,300 mm²/s (rotor No.4/12 rpm)

From a calculation based on the above-mentioned viscosity, the thixotropicity degree α was 1.32.

Synthesis Example 3

Synthesis of Organopolysiloxane A-3 of Component (A)

An organopolysiloxane A-3 was obtained in an identical way to that of Synthesis Example 2 except that 25 g of oil X and 308 g of octamethylcyclotetrasiloxane were used. When this viscosity was measured, the following values were obtained, and the thixotropicity degree a was 1.05.

Viscosimetry results:
2,200 mm²/s (rotor No.2/6 rpm),
2,100 mm²/s (rotor No.2/12 rpm)

Synthesis Example 4

Synthesis of Organopolysiloxane A-4 of Component (A)

An organopolysiloxane A-4 was obtained in an identical way to that of Synthesic Example 1, except that 500 g of dimethylpolysiloxane capped at both ends by dimethylvinylsilyl groups and a viscosity at 25° C. of 600 mm²/s, 23 g of a hydrogen organopolysiloxane represented by the above formula (3) and 33 g of organopolysiloxane represented by the following formula (4), were introduced as starting materials.

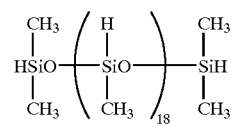

(4)

When the viscosity was measured, the following values were obtained, and the thixotropicity degree α was 1.57.

Viscosimetry result:
72,000 mm²/s (rotor No.4/3 rpm),
46,000 mm²/s (rotor No.4/6 rpm)

Synthesis Example 5

Synthesis of Organopolysiloxane A-5 of Component (A)

An organopolysiloxane A-5 was obtained in an identical way to that of Synthesis Example 2, except that 100 g of oil X and 200 g of octamethylcyclotetrasiloxane were used as starting materials.

When the viscosity was measured, the following values were obtained, and the thixotropicity degree α was 1.02.

Viscosimetry result:
450 mm²/s (rotor No. 1/6 rpm),
440 mm²/s (rotor No. 1/12 rpm)

<Manufacture of Heat-Dissipating Silicone Grease Composition>

The organopolysiloxanes A1–5 obtained in Synthesis Examples 1–5, and the dimethylpolysiloxane A-6 represented by the following equation (5) having a thixotropicity degree α of 1.01, were blended in the compositions shown in Table 1 and Table 2, and mixed at 120° C. for 1 hour using a planetary mixer (Inoue Seisakusyo K. K.), and the heat-dissipating silicone compositions according to Examples 1–6 and Comparative Examples 1–3 were thus obtained. In the tables, B-1 to B-3 respectively have the following significance.
B-1: Zinc oxide powder (irregular shape, average particle diameter: 2 micrometers)
B-2: Silver powder (irregular shape, average particle diameter: 5 micrometers)
B-3: Aluminum powder (irregular shape, average particle diameter: 7 micrometers)

The test results for the viscosity of the above dimethylpolysiloxane A-6 are shown below.

Viscosimetry results:
9,800 mm²/s (rotor No.3/6 rpm),
9,700 mm²/s (rotor No.3/12 rpm)

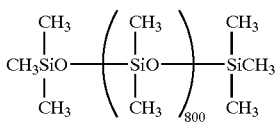

(5)

TABLE 1

|  |  |  | Example | | | | |
|---|---|---|---|---|---|---|---|
|  |  | Component | 1 | 2 | 3 | 4 | 5 |
| Blend (g) | Component (A) | A-1 | 100 |  |  |  |  |
|  |  | A-2 |  | 100 |  |  |  |
|  |  | A-3 |  |  | 100 | 100 | 100 |
|  | Component (B) | B-1 | 400 | 500 | 500 | 200 | 180 |
|  |  | B-2 |  |  |  | 1200 |  |
|  |  | B-3 |  |  |  |  | 720 |
| Oil bleed |  | after 1 day | 0 | 0 | 0 | 0 | 0 |
|  |  | after 7 days | 1 | 1 | 2 | 2 | 1 |
|  |  | after one month | 2 | 2 | 2 | 3 | 2 |
| Thermal conductivity (W/m °C.) |  |  | 1.1 | 1.4 | 1.3 | 2.0 | 3.4 |

TABLE 2

|  |  |  | Comparative Example | | |
|---|---|---|---|---|---|
|  |  | Component | 1 | 2 | 3 |
| Blend (g) | Component (A) | A-4 | 100 |  |  |
|  |  | A-5 |  | 100 |  |
|  |  | A-6 |  |  | 100 |
|  | Component (B) | B-1 | 400 | 400 | 400 |
|  |  | B-2 |  |  |  |
|  |  | B-3 |  |  |  |
| Oil bleed |  | after 1 day | Does not assume a grease-like consistency | 3 | 2 |
|  |  | after 7 days |  | 12 | 7 |
|  |  | after one month |  | 20 | 10 |
| Thermal conductivity (W/m °C.) |  |  | — | 1.1 | 1.1 |

What is claimed is:

1. A heat-dissipating silicone grease composition, comprising:
   (A) 100 weight parts of an organopolysiloxatie having a thixotropicity degree α of 1.03–1.50 and a viscosity at 25° C. of 100–1,000,000 mm²/s, and
   (B) 100–2,000 weight parts of a thermally conductive inorganic filler having an average particle diameter of 0.1–100 micrometers.

2. A heat-dissipating silicone grease composition of claim 1, wherein the thixotropicity degree of a lies in the range of 1.05–1.40.

3. A heat-dissipating silicone grease composition of claim 1, wherein a viscosity of the organopolysiloxane of component (A) at 25° C. lies in range of 1,000–100,000m²/s.

4. A heat-dissipating silicone grease composition of claim 1, wherein the organopolysiloxane of component (A) is the one obtained by an addition reaction between an organopolysiloxane having two or more alkenyl groups in the molecule, and a hydrogen organopolysiloxane having two or more SiH group, in the presence of platinum catalyst.

5. A heat-dissipating silicone grease composition of claim 4, wherein said alkenyl groups are vinyl.

6. A heat-dissipating silicone grease composition of claim 4, wherein in said organopolysiloxane having two or more alkenyl groups 90% or more of the organic groups, other than said alkenyl groups, are methyl groups.

7. A heat-dissipating silicone grease composition of claim 4, wherein the hydrogen organopolysiloxane is the one represented by the following formula (1)

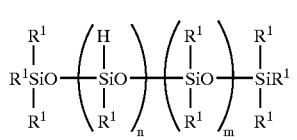

(1)

wherein R¹ is a hydrogen atom, saturated or unsaturated monovalent hydrocarbon group, which is optionally halogenated, having 1–20 carbon atoms, n and m respectively lie within the ranges $1 \leq n \leq 1{,}000$ and $0 \leq m \leq 1{,}000$.

8. A heat-dissipating silicone grease composition of claim 7, wherein 90% or more of R¹ are methyl groups.

9. A heat-dissipating silicone grease composition of claim 1, wherein an average particle diameter of the filler lies in range of 1–20 μm.

10. A heat-dissinating silicone grease composition of claim 1, wherein the blending amount of the filler lies in the range of 200–1,500 weight parts.

11. A heat-dissipating silicone grease composition of claim 2, wherein a viscosity of the organopolysiloxane of component (A) at 25° C. lies in the range of 1,000–100,000 m²/s.

12. A heat-dissipating silicone grease composition of claim 2, wherein the average particle diameter of the filler lies in the range of 1–20 μm.

13. A heat-dissipating silicone grease composition of claim 3, wherein the average particle diameter of the filler lies in the range of 1–20 μm.

14. A heat-dissipating silicone grease composition of claim 11, wherein the average particle diameter of the filler lies in the range of 1–20 μm.

15. A heat-dissipating silicone grease composition of claim 2, wherein the blending amount of the filler lays in the range of 200–1,500 weight parts.

16. A heat-dissipating silicone grease composition of claim 3, wherein the blending amount of the filler lays in the range of 200–1,500 weight parts.

17. A heat-dissipating silicone grease composition of claim 11, wherein the blending amount of the filler lays in the range of 200–1,500 weight parts.

18. A heat-dissipating silicone grease composition of claim 14, wherein the blending amount of the filler lays in the range of 200–1,500 weight parts.

19. A heat-dissipating silicone grease composition of claim 4, wherein said alkenyl group is vinyl, allyl, 1-butenyl or 1-hexenyl.

20. A heat-dissipating silicone grease composition of claim 7, wherein R¹ is in each case methyl, ethyl, propyl, hexyl, octyl, decyl, dodecyl, tetradecyl, hexadecyl, octadecyl, cyclopentyl, cyclohexyl, phenyl, tolyl, vinyl, allyl, 2-phenylethyl, 2-methyl-2-phenylethyl, 3,3,3-trifluoropropyl, 2-(perfluorobutyl)ethyl, 2-(perfluoro octyl) ethyl or p-chlorophenyl.

21. A heat-dissipating silicone grease composition of claim 7, wherein said filler is aluminum powder, zinc oxide powder, alumina powder, boron nitrid powder, aluminium nitride powder, silicon nitride powder, copper powder, silver powder, diamond powder, nickel powder, zinc powder, stainless steel powder or carbon powder.

22. A heat-dissipating silicone grease composition of claim 7, wherein n is 1 to 18 and m is 0 to 27.

23. A heat-dissipating silicone grease composition of claim 1, wherein the thixotropicity degree of α lies in the range of 1.05–1.50.

24. A heat-dissipating silicone grease composition of claim 1, wherein the thixotropicity degree of α lies in the range of 1.16–1.50.

25. A heat-dissipating silicone grease composition of claim 1, wherein the thixotropicity degree of α lies in the range of 1.32–1.50.

* * * * *